(12) United States Patent
Blockton et al.

(10) Patent No.: US 7,039,684 B2
(45) Date of Patent: May 2, 2006

(54) METHOD AND SYSTEM FOR COLLECTING AND PROVIDING MULTIMEDIA CONTENT

(75) Inventors: Justin Blockton, Mamaroneck, NY (US); Tristan Amzallag, Union City, NJ (US)

(73) Assignee: Klipmart Corporation, New York, NY (US)

(*) Notice: Subject to any disclaimer, the term of this patent is extended or adjusted under 35 U.S.C. 154(b) by 579 days.

(21) Appl. No.: 09/783,299

(22) Filed: Feb. 15, 2001

(65) Prior Publication Data

US 2001/0029538 A1    Oct. 11, 2001

Related U.S. Application Data

(60) Provisional application No. 60/182,652, filed on Feb. 15, 2000.

(51) Int. Cl.
*G06F 17/30* (2006.01)
(52) U.S. Cl. .................. 709/213; 709/217; 709/226
(58) Field of Classification Search ........... 709/213, 709/217, 226
See application file for complete search history.

(56) References Cited

U.S. PATENT DOCUMENTS

| | | | |
|---|---|---|---|
| 5,978,381 A | 11/1999 | Perlman et al. | 370/432 |
| 6,237,022 B1* | 5/2001 | Bruck et al. | 709/201 |
| 6,317,780 B1* | 11/2001 | Cohn et al. | 709/217 |
| 6,317,791 B1* | 11/2001 | Cohn et al. | 709/227 |
| 6,330,575 B1* | 12/2001 | Moore et al. | 715/513 |
| 6,605,120 B1* | 8/2003 | Fields et al. | 715/513 |
| 2002/0069244 A1* | 6/2002 | Blair et al. | 709/203 |
| 2003/0130894 A1* | 7/2003 | Huettner et al. | 705/14 |

* cited by examiner

*Primary Examiner*—Reba I. Elmore
(74) *Attorney, Agent, or Firm*—Schiff Hardin LLP

(57) ABSTRACT

A method and system for providing a computerized collection of multimedia content provided by providers, to publishers. An identification of digital content to be included in the system is received, and, responsive thereto, a link to the content is stored in a multimedia item record. A multimedia box is provided, the multimedia box specifying a format in which the multimedia box may be displayed. A publisher multimedia box page is created by inserting data corresponding to the multimedia item into the multimedia box. There are multimedia boxes, each multimedia box corresponding to a publisher, and the multimedia boxes may be stored in a multimedia box database. There are publisher multimedia box pages, the publisher multimedia box pages corresponding to different publishers. According to one embodiment, a hyperlink to the publisher multimedia box page is provided. An "Add Your Media" button, having the link to the content, is provided according to one highly preferred embodiment. A publisher home page may be provided, and the link may be a hyperlink to the publisher home page; and, responsive to selection of the button, further content may be stored in a further multimedia item record.

28 Claims, 12 Drawing Sheets

FILL OUT THE FORMS TO CREATE AN ACCOUNT

○ THE BASICS
USERNAME [PUB1]
PASSWORD [*******]

○ CONTACT INFO
FIRST NAME [JIM]
LAST NAME [SMITH]
EMAIL [JSMITH@PUBLISHER.COM]
PHONE [212] - [555] - [5555]

○ COMPANY INFO
COMPANY NAME [PUBLISHER, INC.]
COMPANY URL [HTTP://WWW.PUBLISHER.COM]
ADDRESS 1 [100 MAIN STREET]
ADDRESS 2 [#2-D]
CITY [NEW YORK]
STATE [NY ▽]
ZIP [10001] - [ ]
PUBLISHER TYPE [-WEEKLY ▽]

○ HOW THE LINKS WILL LOOK ON YOUR SITE
AUDIO ○ DEFAULT ICON ◁   ○ [YOUR ICON URL]
      ○ [KLIPBOX NAME]   ⊙ [HEAR IT!]
VIDEO ⊙ DEFAULT ICON     ○ [YOUR ICON URL]
      ○ [KLIPBOX NAME]   ○ [YOUR TEXT]

○ HOW THE ADD YOUR MEDIA BUTTON WILL LOOK ON YOUR SITE
ADD YOUR MEDIA ○ DEFAULT BUTTON         ○ [YOUR ICON URL]
               ⊙ "ADD YOUR MULTIMEDIA"  ○ [YOUR TEXT]

[CLEAR FORM] [REGISTER]

FIG. 1A

EDIT THE LOOK OF YOUR KLIPBOX
*CHECK "SIZE AND FIT" IF THE WIDTH IF YOUR LOGO EXCEEDS 200 PIXELS.

| | |
|---|---|
| ART | |
| BOOKS | |
| MOVIES | |
| MUSIC | |
| NEWS | |
| SPORTS | |
| THEATER | |
| TV | |
| CHECKOUT | |
| VIEW KART | |
| KLIPBOX | |
| EDIT ACCT. | |
| LOGOUT | |

○ GENERAL SETTINGS

LOGO URL [HTTP://WWW.PUBLISHER.COM] ☐ SIZE TO FIT
FONT [VERDANA ▽]

○ COLOR SETTINGS

BACKGROUND COLOR ON URL [e0e0e0]
FONT COLOR [BLACK]

○ MENU SETTINGS

MENU BACKGROUND COLOR [212121]
MENU FONT COLOR [WHITE]

○ DROPDOWN SETTINGS

DROPDOWN COLOR [WHITE]
DROPDOWN FONT COLOR [BLACK]

[CLEAR FORM] [VIEW KLIPBOX] [SAVE KLIPBOX]

FIG. 1B

| 6 ITEMS IN KART |
|---|
| ART |
| BOOKS |
| MOVIES |
| MUSIC |
| NEWS |
| SPORTS |
| THEATER |
| TV |

| CHECKOUT |
|---|
| VIEW KART |
| KLIPBOX |
| EDIT ACCT. |
| LOGOUT |

LAST 3 DAYS ▽  ALL AREA ▽  ALL MOVIES ▽  [ ] GO

9 KLIPS FOUND >> 1-9 DISPLAYED

| SELECT | BOXNAME | PROVIDER | CATEGORY | ADDED | REGION |
|---|---|---|---|---|---|
| ☐ | BEFORE NIGHT FALLS | FINE LINE FEATURES | DRAMA | 01/02/01 | ALL |
| ☑ | DR. T AND THE WOMEN | ARTISAN | DRAMA | 01/04/01 | ALL |
| ☐ | FAITHLESS | IDP DISTRIBUTION | DRAMA | 01/03/01 | NY |
| ☐ | FAITHLESS | IDP DISTRIBUTION | DRAMA | 01/04/01 | NY |
| ☑ | INVISIBLE CIRCUS | FINE LINE FEATURES | DRAMA | 01/02/01 | ALL |
| ☐ | LIKE WATER FOR CHOCOLATE | MIRAMAX | FOREIGN | 01/02/01 | ALL |
| ☐ | ORIGINAL SIN | MGM | HISTORY | 01/02/01 | ALL |
| ☑ | REQUIEM FOR A DREAM | ARTISAN | DRAMA | 01/04/01 | ALL |
| ☐ | TOWN & COUNTRY | NEW LINE CINEMA | COMEDY | 01/02/01 | ALL |

[ ADD TO KART ]   [ CHECKOUT ]

FIG.1C

FILL OUT THE FORMS TO CREATE AN ACCOUNT

○ THE BASICS
USERNAME [PRO1]
PASSWORD [****]

○ CONTACT INFO
FIRST NAME [HANK]
LAST NAME [JOHNSON]
EMAIL [HJOHNSON@PROVIDER.COM]
PHONE [212] - [333] - [3333]

○ COMPANY INFO
COMPANY NAME [PROVIDER, CORP.]
COMPANY URL [HTTP://WWW.PROVIDER.COM]
ADDRESS 1 [1010 ELM STREET]
ADDRESS 2 [3RD FL]
CITY [NEW YORK]
STATE [NY ▽]
ZIP [10002] - [ ]

[CLEAR FORM] [REGISTER]

FIG.2A

FILL OUT THE FORMS TO ADD A NEW KLIP.

○ THE BASICS

| | |
|---|---|
| KLIPBOX NAME | STAR WARS |
| REGION | ALL ▽ |
| CATEGORY | MOVIES ▽  SCI-FI ▽ |
| SITE URL | HTTP://WWW.STARWARS.COM |

ADD KLIP
ARCHIVE
FILTER
EDIT ACCT.
LOGOUT

○ KLIP INFORMATION

| | |
|---|---|
| NAME OF KLIP | OFFICIAL TRAILER |
| AUDIO FORMATS | |
| PICTURE | HTTP:// |
| MP3 | HTTP:// |
| REAL AUDIO | HTTP:// |
| WINDOWS AUDIO | HTTP:// |
| WAV | HTTP:// |
| VIDEO FORMATS | |
| REAL VIDEO | HTTP://WWW.STARWARS.COM/TRAILER.RAM |
| WINDOWS VIDEO | HTTP://WWW.STARWARS.COM/TRAILER.ASX |
| QUICKTIME | HTTP://WWW.STARWARS.COM/TRAILER.MOV  240 W  200 H |
| FLASH | HTTP:// |

[CLEAR FORM]  [SUBMIT & ADD MORE KLIPS]  [SUBMIT & FINISH]

FIG. 2B

| YOUR MULTIMEDIA ARCHIVE | | | |
|---|---|---|---|
| YOU HAVE 4 KLIPS IN YOUR ARCHIVE >> 1-4 DISPLAYED | | | |
| ○ MOVIES (1) | | | |
| [EDIT] STAR WARS | | SCI-FI | [DELETE] |
| ○ MUSIC (3) | | | |
| [EDIT] NOVENA | | WORLD | [DELETE] |
| [EDIT] ROCKET MARTIN | | POP | [DELETE] |
| [EDIT] THE NERVE | | ROCK | [DELETE] |

Sidebar: ADD KLIP / ARCHIVE / FILTER / EDIT ACCT. / LOGOUT

FIG.2C

| ADD KLIP |
|---|
| ARCHIVE |
| FILTER |
| EDIT ACCT. |
| LOGOUT |

| MOST RECENT ▽ | ALL AREA ▽ | ALL CATEGORIES ▽ | | GO |
|---|---|---|---|---|

45 TOTAL PUBLISHERS >> 5 MOST RECENT ADDITIONS BELOW (CHECK TO AUTHORIZE)

| AUTHORIZE | NAME | CATEGORY | REGION | DATE |
|---|---|---|---|---|
| ☐ | KIBO | MAGAZINE-WEEKLY | DC | 12/28/00 |
| ☐ | JOLIE RICKMAN | PORTAL-MUSIC | NY | 12/28/00 |
| ☑ | ULSTER PUBLISHING | NEWSPAPER-WEEKLY | NY | 10/06/00 |
| ☐ | TIMES PUBLISHING CO. | NEWSPAPER-DAILY | TX | 10/30/00 |
| ☐ | THE SENTINEL | NEWSPAPER-DAILY | PA | 11/30/00 |

TURN MY FILTER OFF

METHOD AND SYSTEM FOR COLLECTING AND PROVIDING MULTIMEDIA CONTENT

PRIOR APPLICATION

This application claims the priority of U.S. provisional application Ser. No. 60/182,652, filed Feb. 15, 2000, by Justin Blockton and Tristan Amzallag, the content of which is expressly incorporated herein by reference.

BACKGROUND OF THE INVENTION

1. Field of the Invention

The present invention relates generally to the field of Internet multimedia content service. More particularly, the invention provides a system and method for incorporating multimedia items into an Internet website by combining a customized publisher web page with still picture image, audio or video multimedia items. A multimedia item includes, by way of example only, a digital movie trailer, a piece of a digital song, a short promotional multimedia "teaser", or even a longer multimedia item.

2. Description of the Related Art

Aggregators of digital content develop sites which aggregate content. However, aggregators ordinarily do not distribute or syndicate the content. Furthermore, searching for content among various sites which aggregate content can be unwieldy. Each search performed returns dozens of links to individual pieces of multimedia (related or unrelated). Sites which contain aggregated content principally are therefore destination sites.

One example of a conventional business to consumer multimedia aggregator site is Streamsearch. Streamsearch has agreements with multimedia providers whereby it showcases the provider's audio and video content in its search engine. Streamsearch has a vast array of searchable multimedia content, all to be viewed at Streamsearch.com. Streamsearch does not distribute. It is a typical business-to-consumer site, where users can go to listen or view multimedia.

As traditional flat content syndication sites have recently begun to incorporate multimedia, they do not have much to offer. The multimedia that they do have is available as a complement to their text articles. Furthermore, these syndication sites dictate what content is available to their clients. This typically excludes all local multimedia (music, theater, sports, etc.) and the possibility of multimedia classified and personal ads. In addition to the foregoing disadvantages, these syndicated services are unfortunately very expensive.

iSyndicate, one such flat content syndication site, provides text content to sites. iSyndicate provides sites with bundled content packages ranging from a Rollingstone.com music search box provided by Rolling Stone to a stock ticker quoting system provided by Quote.com to an article provided by the New York Times. iSyndicate has arrangements with over 350 content Providers and services a network of over 100,000 sites. iSyndicate Express is a product, in which iSyndicate provides content, and a customized hyperlink to be embedded in the Publisher website.

Another conventional company in the flat content syndication market is Screaming Media. The company receives news articles and other proprietary content from provider sites. Screaming Media then distributes this content to registered subscriber websites based on a profile. Screaming Media charges both providers and subscriber websites for content distribution and proprietary content enhancement respectively.

Reuters.com is an example of a specific multimedia syndicator. Their multimedia service focuses on top general-interest news, such as a Presidential summit or an earthquake. Major breaking stories are updated throughout the day. Online text news reports plus complementary multimedia content is delivered in ready-to-use, graphically designed, HTML pages, so publisher sites do not have to invest in the infrastructure or staffing of a newsroom. The Reuters.com service is only their news, albeit an excellent but extremely expensive service.

Only recently, a few sites have begun to syndicate a broad selection of multimedia content. One such site is VideoAXS. VideoAXS receives generic news stories & syndicates them out to Newspaper websites. VideoAXS displays the video in a custom pop-up window, but the customization process is not automated and the content offering is fixed and limited. Another new multimedia syndication service is Lineup.com. Lineup has categories such as movies & music, but very little content. Once again (as with every service on the Internet) the content displayed on the site is the only option. There is no ability for their clients to obtain all of the audio & video they need to compliment their sites.

The Internet multimedia subsector is still largely fragmented, highly specialized, and lacks any commercial and uniting infrastructure. Unfortunately, existing sites are media specific, and require informed Users to seek out specific sites to view multimedia. The average User will frequent their daily newspaper or weekly magazine when on the Internet. There still remains a need to bring rich multimedia directly to Publisher's traditional sites to enhance users' overall experience.

Consequently, there exists an unmet need for a system and method for locating a multimedia item without having to search the entire Internet or entire web page. Further, there is still a need for a system and method where a publisher can simply select a multimedia item and this multimedia item is customized and posted on his site. Furthermore a system by which the Publisher can direct any content owner on the internet to add audio & video for inclusion in their site. An open platform, multimedia service that allows for full customization of content. Anything from local music listings to classified ads to little league baseball games could be complimented with audio and video using this system.

It is therefore an object of this invention to provide a method and system that makes it possible to receive, categorize and seamlessly post multimedia onto a website.

It is a further object of the invention to provide a method and a system for incorporating the multimedia items into a customized web page, which can be later dynamically accessed by the end-user.

One advantage of the present invention is its distribution model. Conventional sites are media specific, and require informed users to seek out specific sites to view multimedia items. The invention will provide publishers with an infrastructure network to readily obtain multimedia from providers that will enhance information and presentation on publisher websites.

Another advantage of the invention is that it offers a customizable presentation of every element for seamless site integration.

The present invention avoids the failing of the prior art by providing a flexible content management tool, customizable multimedia box, and seamless integration without requiring storage of any multimedia on the publisher server.

Other purposes and advantages of this invention will become apparent as the description proceeds.

BRIEF SUMMARY OF THE INVENTION

According to the invention, there is provided a method and system for providing a computerized collection of multimedia content provided by providers, to publishers. An identification of digital content to be included in the system is received, and, responsive thereto, a link to the content is stored in a multimedia item record. A multimedia box is provided, the multimedia box specifying a format in which the multimedia box may be displayed. A publisher multimedia box page is created by inserting data corresponding to the multimedia item into the multimedia box.

There may be provided some content and multimedia item records, each multimedia item record storing a link corresponding to certain content; and the multimedia item records may be stored in a multimedia item database.

There may be provided multimedia boxes, each multimedia box corresponding to a publisher, and the multimedia boxes may be stored in a multimedia box database. There may be provided publisher multimedia box pages, the publisher multimedia box pages corresponding to different publishers. According to one embodiment, following the creation, a hyperlink to the publisher multimedia box page is provided.

According to one embodiment, a menubox is provided, the menubox including at least a portion of the multimedia boxes, and, responsive to a request for the menubox, a list of the multimedia boxes included in the menubox is displayed. The link to the content in the stored multimedia item may be updated.

A publisher record may be stored, responsive to a request to register by the publisher, the publisher record having identification information and aesthetic information. A provider record may be stored, responsive to a request to register the provider, the provider record having identification information. Multiple publisher records may be provided, each corresponding to a publisher, records stored in a user database. Multiple provider records may be provided, each corresponding to a provider, records stored in a user database.

A button, having the link to the content, is provided according to one highly preferred embodiment. A publisher home page may be provided, and the link may be a hyperlink to the publisher home page; and, responsive to selection of the button, further content may be stored in a further multimedia item record.

These and other objects, features and advantages of the present invention are readily apparent from the following drawings and detailed description.

BRIEF DESCRIPTION OF THE DRAWINGS

All the above and other characteristics and advantages of the invention will be better understood through the following illustrative description of preferred embodiments, with reference to the appended drawings, wherein:

FIG. 1A shows an example of a web page, according to a preferred embodiment of the invention, designed for publishers to register.

FIG. 1B shows an example of a web page, according to a preferred embodiment of the invention, for publishers to determine the aesthetics of their multimedia box.

FIG. 1C shows an example of a web page, according to a preferred embodiment of the invention, for a publisher to search for multimedia items.

FIG. 2A shows an example of a web page, according to a preferred embodiment of the invention, designed for providers to register.

FIG. 2B shows an example of a web page, according to a preferred embodiment of the invention, for providers to add multimedia items and/or create a multimedia box.

FIG. 2C shows an example of a web page, according to a preferred embodiment of the invention, for an archive of a provider's multimedia boxes.

FIG. 2D shows an example of a web page, according to a preferred embodiment of the invention, for a provider to identify a publisher(s) to receive multimedia items.

FIG. 3 shows an example of a menubox embedded in a publisher web site.

DETAILED DESCRIPTION OF THE PREFERRED EMBODIMENTS

Figure 4:
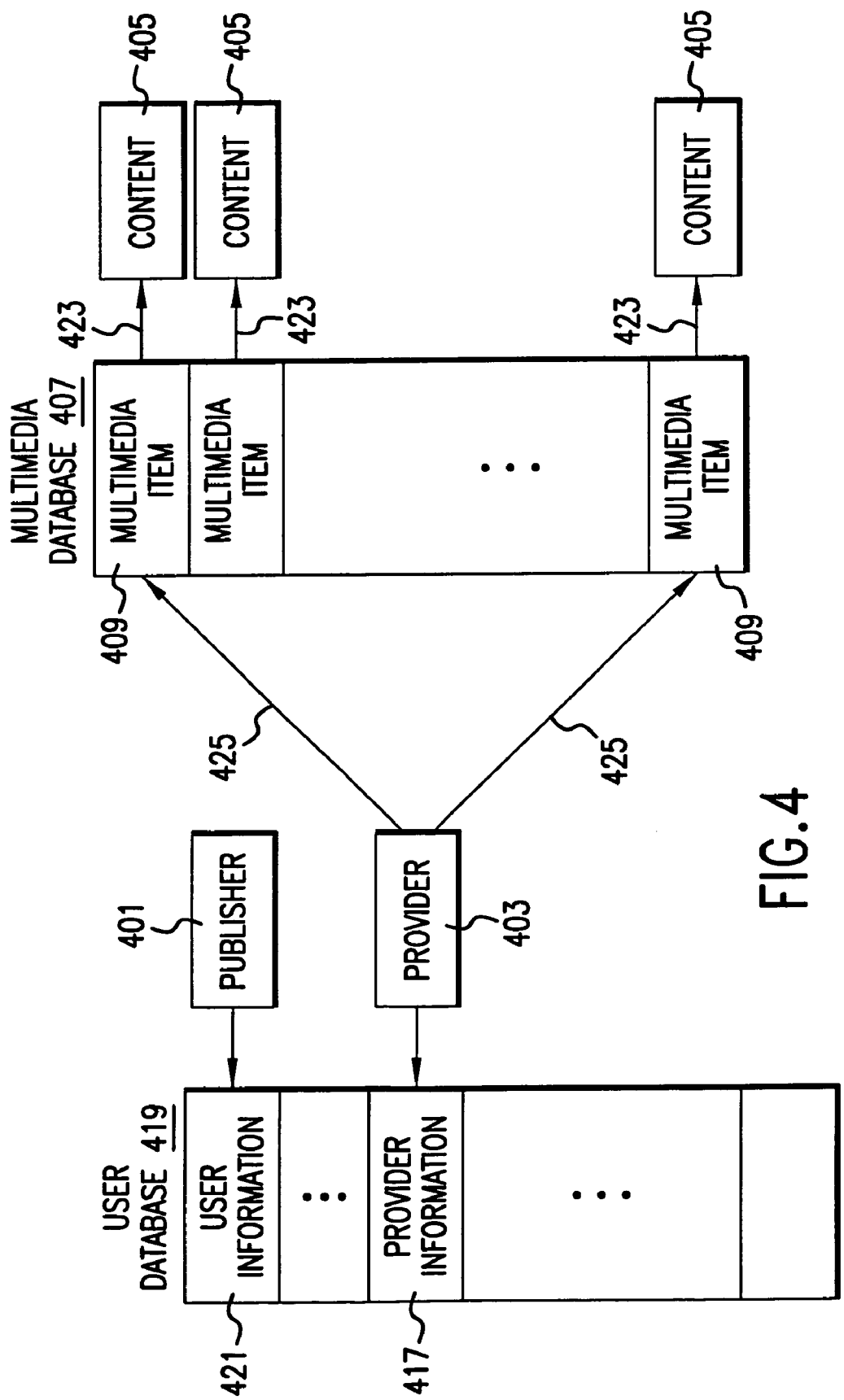
FIG. 4 illustrates the databases in the system.

Reference is made to FIG. 4, generally illustrating the elements in the preferred embodiment of the system. The relevant participants on the web are the publisher 401 and the provider 403. Numerous publishers 401 and providers 403 can be serviced by the invention. The invention provides a convenient method to index available content 405, whilst encouraging participation by publishers 401 and providers 403.

User information 421 corresponding to each publisher 401 is stored in a user database 419. Provider information 417 corresponding to each provider 403 is stored in the user database as well 417. User information and provider information are described in greater detail below.

Multimedia items 409 are stored in a multimedia database 407 and serve to provide, among other things, access to content itself. Content 405 is provided via links 423 from or addresses in the multimedia items 409. The multimedia items 409 have been inserted into the database 407 responsive to requests 425 from providers 403.

Preferably, hyperlinks 423 to the actual content 405 are stored in the multimedia database. Design and formatting for each publisher's multimedia box is stored in the user information 421 records in the user database 419. The publisher can search the multimedia database for multimedia, then select a portion of his search results.

The ability to cut and paste the publisher multimedia boxes 507, multimedia items 409, and multimedia boxes 413 is readily provided through utilization of buttons.

Figure 5:
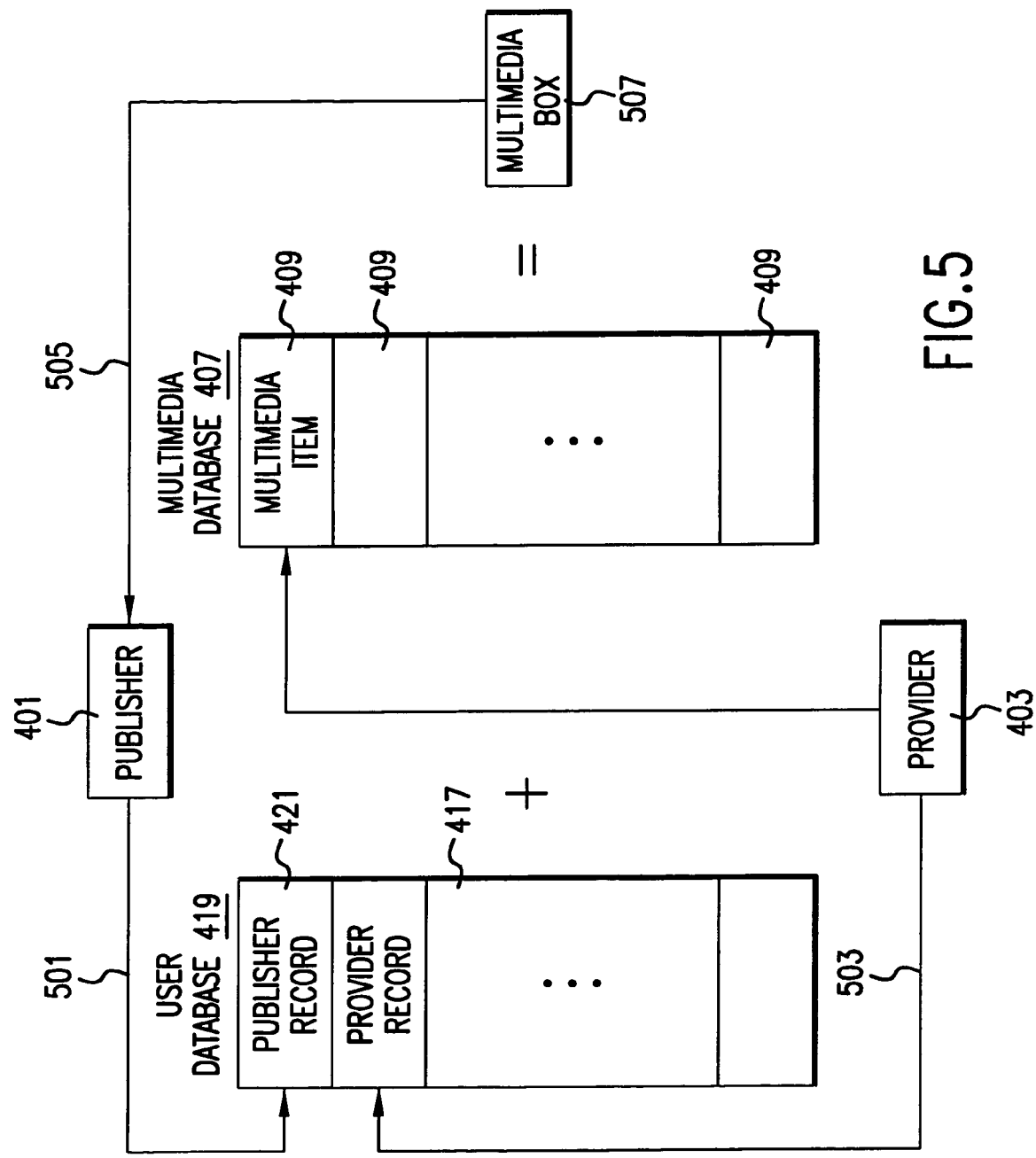
FIG. 5 is a block diagram illustrating the creation of a multimedia box.

Reference is made to FIG. 5, illustrating the creation of a multimedia box. A publisher (or user) information record 421 corresponding to a publisher 401 is created 501 in response to the publisher 401 registering, and stored in the user database 419. A provider information record 417 is created in response to a provider 403 registering, and stored in the user database 419. A multimedia item record 409 is created by the provider 403 adding content to the system, as described in detail below. A multimedia box 507 is created, responsive to opening of the box, by combining a specified publisher record 421 and a specified multimedia item 409.

For the purposes of this description, the end-user is defined as the consumer of multimedia items. The publisher is defined as the purveyor of a web site (including multimedia items) that offers services to end-users, such as a retailer, magazine, or destination site. The providers typically are the owners, creator, publishers or distributors of content, or multimedia items.

It is assumed that the multimedia content 405 is available via a network in digital format. Multimedia contents referenced via multimedia items 409 include, without limitation, text, audio, animation, and/or video of any type; excerpts of complete multimedia content, such as trailers, promotional teasers, etc.; excerpts combined with other matter; and complete content, such as movies, books, newspapers, posters, advertisements, music, etc.

According to the invention, available content does not need to leave the content provider site. The system needs only the specific address of the piece of multimedia (for example, http://www.moviestudio.com/video/trailer.ram). In sum, the invention provides a system and method for the creation, maintenance, and use of a sophisticated, easy-to-use, on-line "card catalog" of digital content.

The following are the three main processes, discussed below:

The publisher process.
The provider process.
The creation of a multimedia box process.

I. The Publisher Process

A. Registration

Reference is made to FIG. 5. In the most highly preferred embodiment of the system, registration 501 is required for each new publisher. The publisher visits the system Homepage, indicates that it wishes to register or "Join", and then indicates it is a publisher, for example, "I want to enhance my site with Multimedia".

In the preferred embodiment, the system then requests registration information such as contact information, identification information, and customization selections, from the publisher. In highly preferred embodiments, such information includes:

Contact Information (Username, password, First Name, Last Name, E-mail, Phone);
Company Information (Company Name, Company URL, Address, City, State, Zip, Type of Site, e.g. newspaper, portal, etc. and Subcategory related to the Type of Site, e.g., weekly, daily, etc.); and
Customize Multimedia box—aesthetic information (Font, Logo URL, Background color/URL, Call Tag, Font Color, Menu Background Color, Menu Font Color, Dropdown Color, Dropdown Font Color).

The foregoing requested information could change depending on the implementation.

Once the registration information form is input, this information is used to create a new user record, specifically a publisher record 421, which is then stored in the user database.

B. Media Search

A publisher may add one or more multimedia items to his website. In highly preferred embodiments, the publisher will follow a series of steps to specify the categories of multimedia items to be automatically added.

1. The publisher logs onto the system, preferably using its username and password. This calls a search to be performed to find and verify the publisher's record on the database.
2. The publisher may then select the multimedia items to appear on the publisher's site. According to the menu box option, the system displays a list of multimedia items which historically have been added to the publisher's menu box. Preferably, the system displays a default list of multimedia items. In the most highly preferred embodiment, the publisher is then brought to a publisher archive page specific to the publisher which shows every multimedia item which the publisher has ever selected and checked out. However, the listing could be done in any of a number of ways, including displaying only current multimedia items. In sum, Publishers simply select everything that they would like to appear on their site and it appears in the menu box. This step may be omitted.
3. The publisher then is prompted by the system to select from the list of searchable categories. Categories include, for example, art, movies, music, news, books, TV, Theater, etc. Nevertheless, it is possible that categories can be expanded by users, and could potentially encompass any or all searchable fields in the multimedia item database, such, classifieds, personal ads, etc., and thus such examples are not considered to be limitative.
4. Once the publisher selects a category, in the preferred embodiment, a default search is performed, resulting in a listing to the publisher of all the multimedia items in that category added to the multimedia item database. The listing could be limited in time, for example, all multimedia items added in this category in the past week. Alternatively, a publisher might be looking for something more specific, involving multiple searchable fields, such as NY>Music>Punk>Added this week. As another alternative, a publisher might be searching for one specific item. The search result information preferably lists corresponding identification information, such as in the following manner: Name, Provider, Category, State, Date. The located items may be added to the publisher's cart.
5. The publisher may view the multimedia box corresponding to the located item(s) if desired, by clicking the underlined Name of the multimedia item in the search result information list, which will link to the multimedia item. In the preferred embodiment, the link contains javascript that opens a small pop-up window in accordance with known methods, to run/display the multimedia item.
6. In the preferred embodiment, the publisher has the option to refine the search result information list and/or search by one or all of the searchable fields, such as the following: Category (e.g. Only action Movies), Date (e.g. only movies added in the past 24 hours), State (e.g., only movies from NY), Keyword (e.g., searching specifically for a keyword).
7. The publisher may select a multimedia item from the search result information list. To choose a multimedia item from the search result information list in the preferred embodiment, the provider checks the checkbox next to the name of the multimedia item and presses "Add to Cart". When a publisher checks the checkbox and Adds to Cart, he is creating a new record in a shopping cart database, in the usual manner, for that publisher.
8. In the preferred embodiment, the publisher may search for more multimedia items within the same category, search for multimedia items in another category, view his shopping cart or simply checkout, with the multimedia item/s that he has already chosen and which are in the shopping cart. Any available shopping cart techniques or program is appropriate.
9. Alternatively, Publishers can simply "Checkout" all of the multimedia selected, receive the code for each multimedia item and paste them all into their site separately.

C. Checkout

Checkout is the process whereby the publisher receives a multimedia box link, which can be pasted onto the publisher's site. The ability to cut and paste the link provides an ease of use. The multimedia box link opens the customized multimedia box on the publisher site. In the preferred embodiment, checkout occurs at a conventional checkout page. Further, in an optional embodiment, the multimedia box link is provided as a button. In highly preferred embodiments, the code is displayed in a text area to be pasted into the publisher site.

The checkout page of the preferred embodiment would contain the following: multimedia item name; HTML code to be selected; "Select Code" button.

In response to the checkout, the HTML code is generated by combining the unique multimedia item number for the selected multimedia item, with the publisher's multimedia box file. This enables the selected multimedia item to be provided in the customized format preferred by the publisher. In the preferred embodiment, pressing "Select Code" selects the entire hyperlink to make it easier to copy.

Having checked out, the publisher copies the selected link and pastes this link into the HTML code of his own site for example, near the review for the Multimedia item. In the preferred embodiment, the link is an icon previously specified by the publisher. The link that was pasted then will look like the video/audio icon (or the text) that publisher has specified in the Media Link information section of the registration form.

When an end user clicks the link on the publisher's web site, the chosen multimedia box opens again, preferably as a small java window, playing the multimedia item, such as a video, supplied by the multimedia provider and looking as the Publisher specified in the customized multimedia box section of the registration form.

II. Provider Process

A. Registration

Reference is made to FIG. 5. In the preferred embodiment of the system, registration 503 is required for each new provider. The provider visits the system Homepage, indicates that it wishes to register or "Join", and then indicates indicate that it is a provider, e.g. "I want to distribute my multimedia through the system".

In the preferred embodiment, the system then requests registration information such as contact information, identification information, and custom selections, from the provider. In highly preferred embodiments, such information includes, for example:

Contact Information (e.g., Username, password, First Name, Last Name, E-mail, Phone);

Company Information (e.g., Company Name, Company URL, Address, City, State, Zip, Type of site and subcategory);

Sales Information (e.g., do you have merchandise available at any of the following _____; Do you have tickets available at any of the following _____;)

Additional multimedia items may be added to the box. Once the provider information is inputted, a new provider record 417 is created and this information is stored in the user database 419. In the preferred embodiment, both publisher records and provider records are stored in a same database. This is efficient since the contact information and company information fields of the respective records have the same format. Alternatively, publisher records and provider records could be stored in separate databases.

B. Add a Multimedia item

Reference is made to FIG. 4. A provider may wish to make content 405 available to the system. This assumes that the content 405 is accessible via a network. The content to be added will be correlated to a multimedia item 409. To add a multimedia item to the system, the provider is prompted for information relevant to the item. For example, in the preferred embodiment, the provider is prompted to fill out the following:

Multimedia box name (e.g., Fantasia)

Category and Subcategory (e.g., Movies>>animation)

Site URL for the content 405 itself (e.g., http://www.Fantasia-Movie.com)

Name of Multimedia item 1 (e.g., Trailer)

URLs of multimedia item 1 in one or more, potentially varied, media formats (e.g., http://www.Fantasia-Movie.com/media/trailer.ram)

Additional multimedia items may be added to the box. Once the information is inputted, a new multimedia item record 409 is created and this information is stored in the Multimedia item database 407. In the preferred embodiment, each record 409 is given a unique number that will serve to identify the information used to populate the Multimedia box viewed or accessed from the Publisher's page.

III. Creation of the Multimedia Box Process

Reference is made to FIG. 5. When a publisher 401 calls the system's web site, the multimedia box 507 is created by combining or merging the multimedia items 409 and the empty multimedia box, as specified by the aesthetic information in the publisher record 421. In the preferred embodiment, the following procedures run:

Find CGI-BIN folder.

Call database program in order to locate the multimedia item(s) 409 in the multimedia item database 407, as specified in the call to the site.

Call multimedia box procedure, in order to merge the located multimedia item(s) 409 and the user's multimedia box as specified in the publisher record 421.

Multimedia box procedure does a search of the multimedia item data base 407 for the unique Multimedia item ID#

Multimedia box procedure gathers stored information from the multimedia database 407 related to the unique Multimedia item ID #

Multimedia box procedure sends this related information to populate the unique publisher multimedia box 507.

Thus the system generates a URL for the publisher multimedia box 507, together with the unique id number of the multimedia item.

The system uses the information from the two databases (the multimedia item database and the multimedia box database) and to create a new multimedia box 507 record. In the preferred embodiment, this new multimedia box 507 is created after each call, such that the contents are built on the fly and are as current as possible. Alternatively, it is possible to store the multimedia box 507.

Definitions:

Aesthetic Information: Aesthetic information describes the qualities and appearance of a customized box, link or button. In the context of this description, aesthetic information means, for example, specific font style, font colors, link colors and background colors. The term aesthetic information also includes deep linked logos, buttons and pictures from the user website.

Deep Link: The term deep link will be used to describe a direct link to a multimedia item. In the preferred embodiment, it includes media specific, HTML links. An example of a typical, non-deep HTML link would be: http://www-.Batman.com. That link would bring an end user to the Batman.com website. In contrast, an example of a deep link would be: http://www.Batman.com/video/scene1.ram. That deep link will access the Real Media stream for "scene1" directly. Note that the end user utilizing the deep link typically would not arrive at the Batman.com website home page.

End User: The term end user refers to any person visiting a publisher website, and ultimately accessing the provide multimedia item.

Menubox: The term menubox refers to a container of multiple multimedia boxes corresponding to the same publisher. The menubox has attributes analogous to the multimedia box, but differs in that it acts as a menu for all (or a partial collection) of a particular publisher's multimedia boxes. For example, one publisher might have ten multimedia boxes, each corresponding to one of ten different bands, movies, etc. The menubox presents to the end user a menu of the included multimedia boxes, and simply prompts the end user to choose one of the ten. Once this choice is made, the end user is taken to the specific multimedia box of choice.

Multimedia box: The term multimedia box refers to a window, preferably a small browser window, from which the deep linked media content is directly or indirectly accessible, and its supporting data structures. In the preferred embodiment, JavaScript causes the multimedia box to open to roughly 460×200 pixels and removes all toolbars and such from the browser window (much like a pop-up banner advertisement or help window). Because the multimedia box is so small relative to the site, the publisher site substantially is in full view behind it. Additionally, because the aesthetic information such as background color, font, font color and link colors have been specified by the publisher, the end user feels as if he or she has never left the publisher website. An example of what a multimedia box might offer to the end user would be a picture, an audio clip and a link back to the provider's site.

"Add YOUR Media Button": This feature brings the provider from the publisher website to the system's provider registration page. The registration page is where the provider supplies the system with contact information. Once registered the provider is taken directly to the Add Media page where they add among other items, the necessary deep links to create the provider's multimedia box.

The "Multimedia Button" is the customizable button, received at checkout, that opens the multimedia box on the publisher site. The system receives media from the provider, preferably in the form of links or references to the media, most preferably in the form of HTML deep links; combines the received media references with the aesthetic information supplied by the publisher and creates the multimedia box.

Multimedia item: In the context of this description, the term multimedia will be used to describe any text or non-text, internet-based media content. This includes without limitation digital still images (.jpg and .gif formats to name a few), audio (Real Media streams, Windows Media streams and mp3 downloads to name a few), and video (Real Media streams, Windows Media streams and QuickTime downloads to name a few). The invention is sufficiently flexible to adapt to additional internet-based media.

Provider: The term provider refers to any web entity wishing to distribute its own multimedia content to other websites, for reasons such as to promote its own website, product, etc. A typical provider would be a band, movie studio, news service, TV network, etc.

Publisher: The term publisher refers to any web entity wishing to receive multimedia content to be added to its current website. A publisher could be an online magazine, movie review, etc. which would benefit from readily referencing the content from its site. For example, an online movie review would benefit from a link to a short promotional preview of a movie.

The following examples are provided to illustrate the system and method, and are not limitative of the scope of the invention.

EXAMPLE 1

Example 1 (and subsequent examples) will involve the hypothetical publisher.com (a potential publisher, who among things offers weekly newspapers); and Provider.com, a provider of music and movies. Example 1 concerns the addition of a provider's multimedia items to a publisher's web site through the end-user access on the publisher's web site.

1. Reference is made to FIG. 1A. The system requests the publisher to register. The information which Publisher.com is requested to provide includes contact information, and company information such as addresses and type of publication. Further, the system collects information specifying how the "Add Your Media" button will look on the publisher's site, if the default appearance is not selected.

2. Reference is made to FIG. 1B. The system prompts Publisher.com to design the look of its multimedia box. In the present example, Publisher.com specifies its logo and font; its background color or URL and font color; its menu settings including menu background color and menu font color; and its dropdown settings, including dropdown color and dropdown font color.

3. Reference is made to FIG. 1C. The system allows Publisher.com to search for multimedia items to be included in the cart. Items searched for were movies, and three movies were selected: "Dr. T and the Women", "Like Water for Chocolate", and "Requiem for a Dream". Note that Publisher.com may continue to add to its cart, or checkout once it has completed its selection.

Figure 1D:
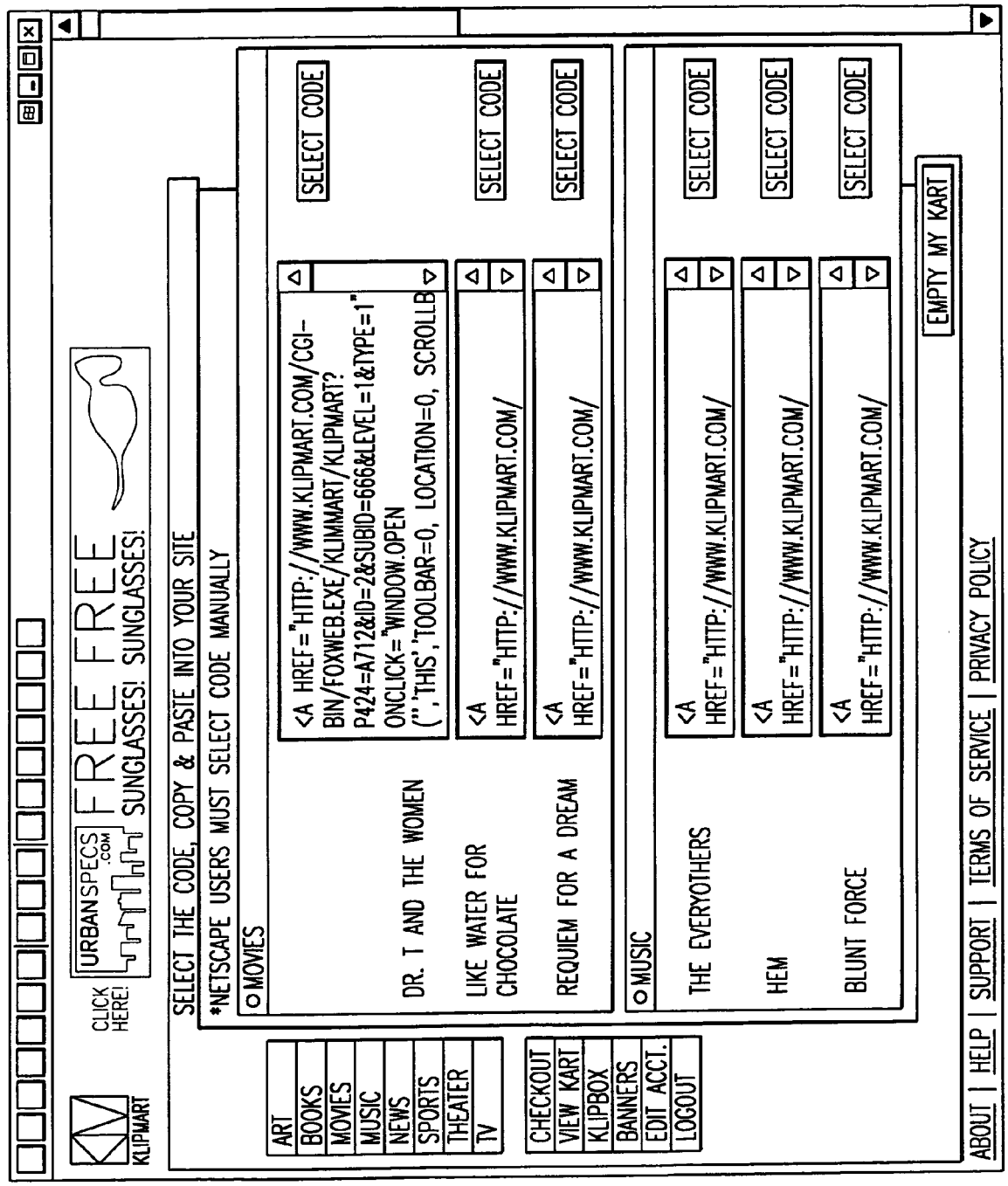
FIG. 1D shows an example of a web page, according to a preferred embodiment of the invention, for a publisher to receive a link(s) for selected multimedia items.

4. Reference is made to FIG. 1D. Here, Publisher.com has checked out the contents of its cart. As illustrated, the system provides links to the selected multimedia items. Here, the links are provided as URLs which may be cut and pasted into Publisher.com's website.

5. Publisher.com then selects, copies and pastes the links into its site at the desired location.

Figure 6:
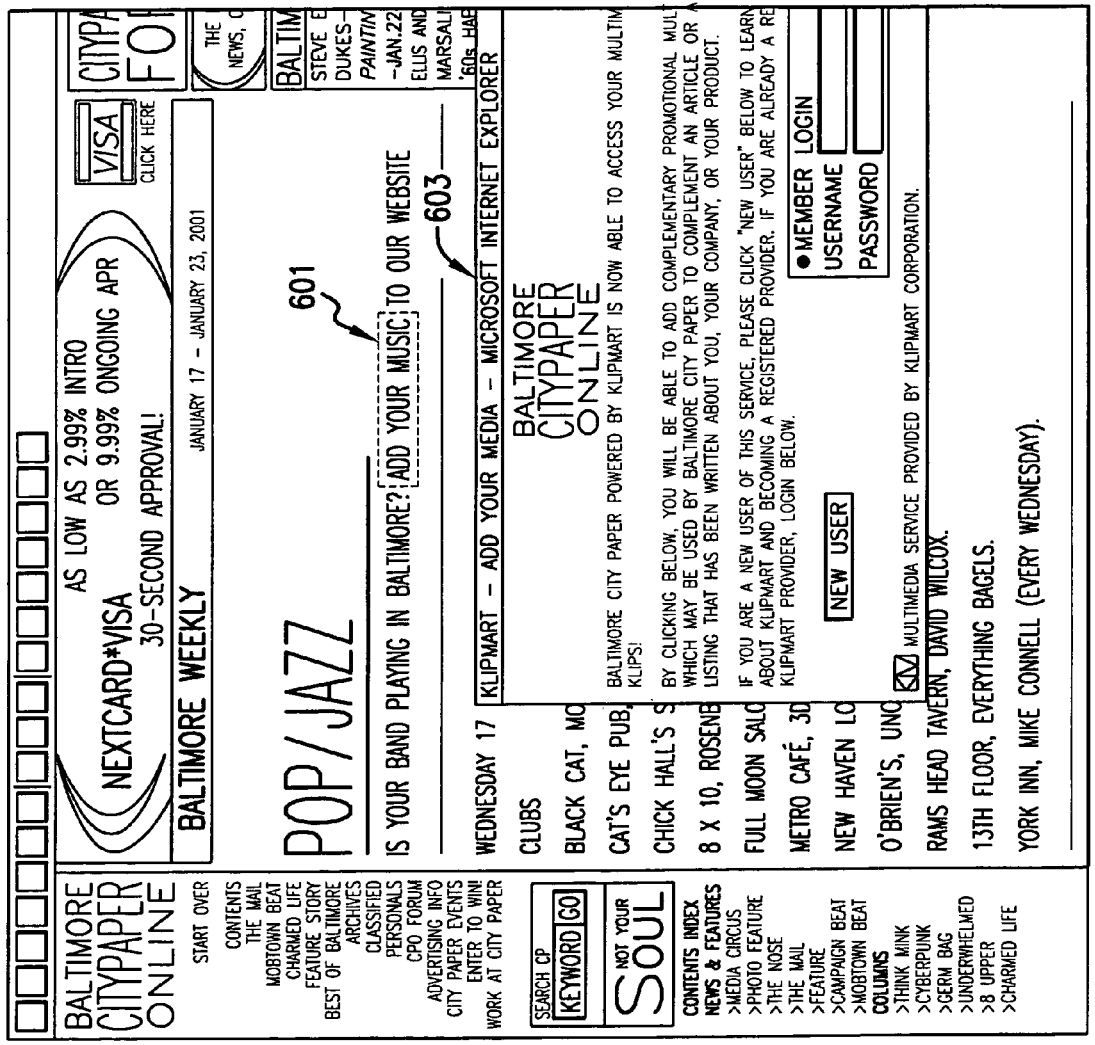
FIG. 6 is an example illustrating an "add multimedia" button on a publisher's web site.

6. Reference is made to FIG. 6. Provider.com notices a reference on the Publisher.com weekly paper web site. It views the "Add Your Media" or "Add Your Music" (or similar) multimedia button 601. In response to the invitation to add its media, it clicks the button 601, a login window 603 is displayed, and the provider arrives at the system's "Add Media" page (Step 8 below).

7. As explained above in connection with the "Provider Process", Provider.com provides the system with registration on a registration page, further illustrated in FIG. 2A. Here, Provider.com inputs its user name and desired password; contact information; and company information.

8. Reference is made to FIG. 2B, illustrating Provider.com adding new multimedia to the system. Here, the provider is prompted for basic information (generally allowing the system to categorize the multimedia); and for multimedia information, such as a name and various URLs for the multimedia. Here, a set of multimedia content is added relating to the science fiction movie "Star Wars", including real video format, windows video format, and Quicktime format.

9. Reference is made to FIG. 2C, illustrating Provider.com's multimedia archive. The archive lists all multimedia that Provider.com has added. Here, the archive include the movie "Star Wars", and music "Novena", "Rocket Martin", and "The Nerve". The multimedia items in the archive may be deleted, or information about any one of the multimedia items may be edited.

10. Reference is made to FIG. 2D, illustrating the filter, where a provider may specify one or more publishers which receive the provider's multimedia items. Here, Provider.com has specified that "Ulster Publishing" is authorized to receive Provider.com's multimedia items.

Figure 3:
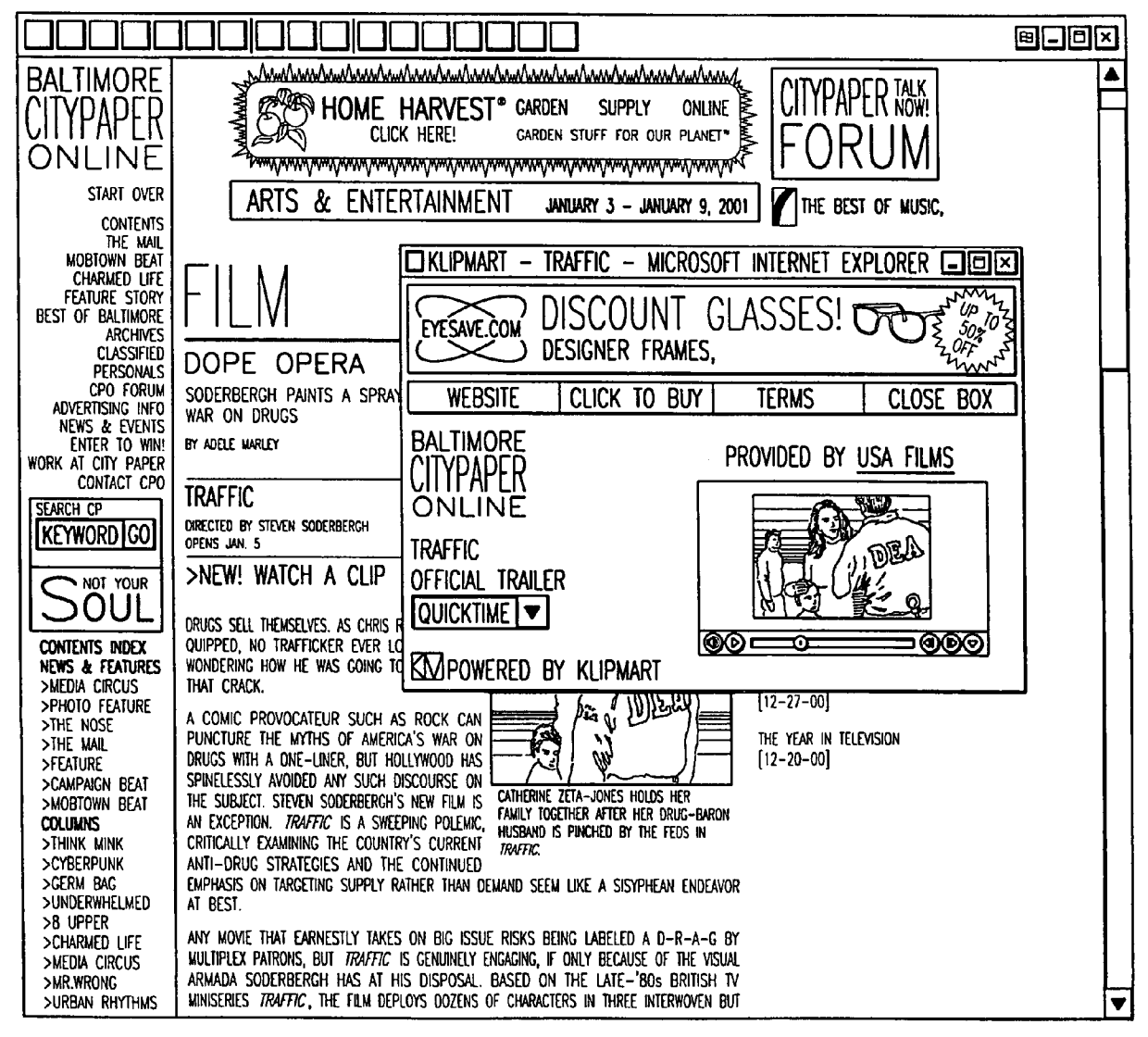

11. The next time a Publisher.com end-user clicks the "View Multimedia" (or similar) button the relevant portions of the publisher and provider databases are merged. Reference is made to FIG. 3, showing an example. Publisher.com has a website offering an online newspaper. The newspaper includes a review of the movie "Traffic". Utilizing the methods discussed above, Publisher.com has embedded a "WATCH A CLIP" button at a relevant spot in the movie review. When the end-user clicks the button, the system follows the link to the multimedia content location and displays the content (here, the official trailer in QuickTime).

EXAMPLE 2

The preferably open nature of the system permits it to be used in any situation involving multimedia. The following example will illustrate how a music venue, The Elbow Room, can accept and post audio for a local band, Adam & the Aunts, with an upcoming show.

1. Adam & the Aunts (the provider) notices a reference on the ElbowRoom.com web site. They view the "Add YOUR Music" multimedia button. In response to the invitation to add their media, they click the button and arrive at the system's "Add Media" page.

2. As explained above in connection with the "Provider Process", Adam & the Aunts provides the system with registration information on a registration page. Here, Adam & the Aunts input their user name and desired password; contact information; and company information.

3. Adam & the Aunts adding is prompted for basic information (generally allowing the system to categorize the multimedia); and for multimedia information, such as a name and various URLs for the multimedia. Adam & the Aunts adds a set of multimedia content relating to their band, including real audio format, mp3 format and a jpg photograph.

4. In this case the provider chooses not to activate their filter. This choice makes their music available to every member of the system.

5. The next time an ElbowRoom.com end-user clicks the "View Multimedia" (or similar) button, the relevant portions of the publisher and provider databases are merged. ElbowRoom.com has a website offering an online concert calendar. The calendar includes a listing of the band Adam & the Aunts. Utilizing the methods discussed above, ElbowRoom.com has embedded a "Hear the Band" button at a relevant spot in the concert calendar. When the end-user clicks the button, the system follows the link to the multimedia content location and displays the content (here, a song clip in real audio).

EXAMPLE 3

The following will illustrate how an online dating site, LoveMatch.com can enhance one of its Personal Advertisements with video.

1. Billy Shears, a man placing a personal advertisement on LoveMatch.com notices a reference on the LoveMatch.com web site. He views the "Add YOUR Media" multimedia button. In response to the invitation to add his media, he clicks the button and arrives at the system's "Add Media" page.

2. As explained above in connection with the "Provider Process", Billy Shears provides the system with registration on a registration page. Here, Billy Shears inputs its user name and desired password; and contact information.

3. Once the registration form has been completed, Billy Shears is taken to the Add Media page. Here, the provider is prompted for basic information (generally allowing the system to categorize the multimedia); and for multimedia information, such as a name and various URLs for the multimedia. Here, a video of Billy Shears on a fishing trip is added including Real Video format and Quicktime format.

4. In the case of something as specific as a personal advertisement, the filter is not necessary. When the provider adds through the LoveMatch.com website, the system knows that they have been referred through LoveMatch.com. Once submitted, Billy Shears' video will only be accessible to LoveMatch.com.

5. The next time a LoveMatch.com end-user clicks the "View Multimedia" (or similar) button the relevant portions of the publisher and provider databases are merged. LoveMatch.com has a website offering with online personal advertisements. The personal ad includes only a text description of Billy Shears. Utilizing the methods discussed above, LoveMatch.com has embedded a "See Video" button at a relevant spot in the personal ad. When the end-user clicks the button, the system follows the link to the multimedia content location and displays the content (here, the fishing video in Real Video & QuickTime).

EXAMPLE 4

The following will illustrate how an online newspaper site, CityNews.com, can use the system to place video advertisements on their pages.

1. Sony, a company placing a banner advertisement on CityNews.com notices a reference on the CityNews.com web site. He views the "Use our new Video ad service" button. In response to the invitation to add his media, he clicks the button and arrives at the system's "Add Media" page.

2. As explained above in connection with the "Provider Process", Sony provides the system with registration on a registration page. Here, Sony inputs its user name and desired password; and contact information.

3. Once the registration form has been completed, Sony is taken to the Add Media page. Here, the provider is prompted for basic information (generally allowing the system to categorize the multimedia); and for multimedia information, such as a name and various URLs for the multimedia. Here, a video advertisement for a Sony Walkman is added including Real Video format and Quicktime format.

4. In the case of something as specific as a video advertisement, the filter is not necessary. When the provider adds through the CityNews.com website, the system knows that they have been referred through CityNews.com. Once submitted, the Sony video will only be accessible to CityNews.com.

5. The next time a CityNews.com end-user clicks the "View Multimedia" (or similar) button the relevant portions of the publisher and provider databases are merged.

As the foregoing examples illustrate, the system and its databases encourage publishers and providers to participate to the fullest extent possible. Every publisher that registers and contributes to the system provides a venue to distribution of content to self-targeted end users; and every provider that registers and contributes geometrically increases the usefulness of the system and attractiveness to end-users. ID The following are example registration forms, and are not meant to be limitative.

Example Publisher Registration Form:
Username:
Password:
BG Color:
Font:
Font Color:
A-Link:
V-Link:
Link Type: (text, image?)
Link Image URL:

Example Provider Registration Form:
Username:
Password:
Category:
State:
Site URL:
Picture URL:
First Audio/Video URL—Formats 1–10: (Real Media, Windows Media, mp3, etc.)

The "username" and "password" protects the privacy of the publisher or provider. The "E-mail address" gives the system the ability to contact the publisher or provider directly. "State" is an example of demographic data that helps the system to track the publishers or providers for targeting advertisements, etc.

In an optional embodiment, the system may provide a menu listing, for example, "Please Select The Media You Would Like to Receive": This is preferably a dropdown menu that allows for fully customizable content. By selecting certain categories, genres and states, for example, the publisher will receive only media applicable to its website.

In another optional embodiment, the system provides the option "Only people who sign Up through my site". According to this alternative, the publisher or provider has the option to receive only media submitted via the button on its own site. This provides a specific way to receive multimedia and a definitive way of insuring that the publisher's or provider's media is applicable.

"Site Name" will be included in the heading on the Main Menu Multimedia box, for example, "Welcome to the [Site Name] Multimedia Library"

"BG Color" specifies the background color for the publisher's multimedia boxes.

"Font" specifies the font for the publisher's multimedia boxes.

"Font Color" specifies the font color for the publisher's multimedia boxes.

"A-Link" specifies the pre-clicked link color for the publisher's multimedia boxes.

"V-Link" specifies the post-clicked link color for the publisher's multimedia boxes.

Where appropriate, the specified data may be applied across each of the publisher's multimedia boxes.

In a preferred "Add YOUR Media" form, FIG. 2B:

A prompt may be provided, to specify the subcategory where the system is to place the finished Multimedia box.

"State" or "Region" or similar should be included to provide the system with one of several categories in which to place the finished Multimedia box.

Also indicated is a "Name" which will be included in the heading on the Multimedia box.

The URL of the website should be indicated to provide a link back to the provider's website. Also, the URL of a related picture may be indicated to provide an address to the picture, thereby allowing the system to display the provider's picture without having to store the image locally.

In the preferred embodiment, this Name of the Multimedia Item is displayed below the Multimedia box title, so that an end users knows what piece of media he or she is to hear/view.

The URL of the multimedia item should be included to permit the system to play the provider's audio/video without having to store the media locally.

The software for the system may be readily implemented via the commercially available FOXPRO software program. The databases may readily be implemented via the commercially available FOXWEB database software program. The system may be run on commercially available general purposes computers on conventional operating systems, such as on WINDOWS NT. Other database programs and operating systems may readily be used.

While the preferred mode and best mode for carrying out the invention have been described, those familiar with the art to which this invention relates will appreciate that various alternative designs and embodiments for practicing the invention are possible, and will fall within the scope of the following claims.

What is claimed is:

1. A method for providing a computerized collection of multimedia content provided by providers, to publishers, comprising the steps of:
    (A) receiving an identification of digital content to be included in the system in a submittal received from a provider of multimedia content, and, responsive thereto, storing a link to the content in a multimedia item record as an intermediary between a content provider and a publisher;
    (B) providing a multimedia box, the multimedia box specifying a format in which the multimedia box may be displayed; and
    (C) creating a publisher multimedia box page by inserting data corresponding to the multimedia item into the multimedia box.

2. The method of claim 1, wherein there are provided a plurality of content and a plurality of multimedia item records, each multimedia item record of the plurality storing a link corresponding to one of the content; and wherein the plurality of multimedia item records are stored in a multimedia item database.

3. The method of claim 1, wherein there are provided a plurality of multimedia boxes, each multimedia box corresponding to a publisher, and wherein the plurality of multimedia boxes are stored in a multimedia box database.

4. The method of claim 1, wherein there are provided a plurality of publisher multimedia box pages, the publisher multimedia box pages corresponding to different publishers.

5. The method of claim 1, further comprising the step of, responsive to the creating step, providing a hyperlink to the publisher multimedia box page.

6. The method of claim 3, further comprising the step of providing a menubox, the menubox including at least a portion of the plurality of multimedia boxes, further comprising the step of,
responsive to a request for the menubox, displaying a list of the multimedia boxes included in the menubox.

7. The method of claim 1, further comprising the step of updating the link to the content in the stored multimedia item.

8. The method of claim 1, further comprising the step of storing a publisher record, responsive to a request to register by the publisher, the publisher record having (i) identification information and (ii) aesthetic information.

9. The method of claim 1, further comprising the step of storing a provider record, responsive to a request to register the provider, the provider record having identification information.

10. The method of claim 1, wherein there are provided a plurality of publisher records, each corresponding to a publisher, the plurality of records being stored in a user database.

11. The method of claim 9, wherein there are provided a plurality of provider records, each corresponding to a provider, the plurality of records stored in a user database.

12. The method of claim 1, further comprising the step of providing a button having the link to the content.

13. The method of claim 12, further comprising the step of providing a publisher home page, and wherein the link is a hyperlink to the publisher home page; and wherein, responsive to selection of the button, a further content is stored in a further multimedia item record.

14. A system for providing a computerized collection of multimedia content provided by providers, to publishers, comprising:
   (A) a received identification of digital content to be included in the system in a submittal received from a provider of multimedia content, and, responsive thereto, a stored link to the content in a multimedia item record as an intermediary between a provider and a publisher;
   (B) a multimedia box, the multimedia box specifying a format in which the multimedia box may be displayed; and
   (C) a publisher multimedia box page created from the multimedia box, the multimedia box page having data corresponding to the multimedia item in the multimedia box.

15. The system of claim 14, wherein there are provided a plurality of content and a plurality of multimedia item records, each multimedia item record of the plurality storing a link corresponding to one of the content; and wherein the plurality of multimedia item records are stored in a multimedia item database.

16. The system of claim 14, wherein there are provided a plurality of multimedia boxes, each multimedia box corresponding to a publisher, and wherein the plurality of multimedia boxes are stored in a multimedia box database.

17. The system of claim 14, wherein there are provided a plurality of publisher multimedia box pages, the publisher multimedia box pages corresponding to different publishers.

18. The system of claim 14, further comprising a hyperlink to the publisher multimedia box page.

19. The system of claim 16, further comprising a menubox, the menubox including at least a portion of the plurality of multimedia boxes; further comprising, responsive to a request for the menubox, a displayed list of the multimedia boxes included in the menubox.

20. The system of claim 14, further comprising an updated link corresponding to the link to the content in the stored multimedia item.

21. The system of claim 14, further comprising a stored publisher record, stored responsive to a request to register by the publisher, the publisher record having (i) identification information and (ii) aesthetic information.

22. The system of claim 14, further comprising a stored provider record, stored responsive to a request to register the provider, the provider record having identification information.

23. The system of claim 14, wherein there are provided a plurality of publisher records, each corresponding to a publisher, the plurality of records stored in a user database.

24. The system of claim 22, wherein there are provided a plurality of provider records, each corresponding to a provider, the plurality of records stored in a user database.

25. The system of claim 14, further comprising a button provided to the user, the button having the link to the content.

26. The system of claim 25, further comprising the step of providing a publisher home page, and wherein the link is a hyperlink to the publisher home page; and wherein, responsive to selection of the button, a further content is stored in a further multimedia item record.

27. A method for providing a computerized collection of multimedia content provided by providers, to publishers, comprising the steps of:
   (A) receiving an identification of digital content to be included in the system in a submittal received from a provider of multimedia content, and, responsive thereto, storing a link to the content in a multimedia item record as an intermediary between a provider and a publisher;
   (B) providing a multimedia box, the multimedia box specifying a format in which the multimedia box may be displayed; and
   (C) creating a publisher multimedia box page by inserting data corresponding to the multimedia item into the multimedia box;
   (D) wherein there are provided a plurality of content and a plurality of multimedia item records, each multimedia item record of the plurality storing a link corresponding to one of the content; and wherein the plurality of multimedia item records are stored in a multimedia item database; wherein there are provided a plurality of multimedia boxes, each multimedia box corresponding to a publisher, and wherein the plurality of multimedia boxes are stored in a multimedia box database; and wherein there are provided a plurality of publisher multimedia box pages, the publisher multimedia box pages corresponding to different publishers;

(E) responsive to the creating step, providing a hyperlink to the publisher multimedia box page;

(F) providing a menubox, the menubox including at least a portion of the plurality of multimedia boxes, further comprising the step of, responsive to a request for the menubox, displaying a list of the multimedia boxes included in the menubox;

(G) updating the link to the content in the stored multimedia item;

(H) storing a publisher record, responsive to a request to register by the publisher, the publisher record having (i) identification information and (ii) aesthetic information;

(I) storing a provider record, responsive to a request to register the provider, the provider record having identification information;

(J) wherein there are provided a plurality of publisher records, each corresponding to a publisher, the plurality of records stored in a user database; and wherein there are provided a plurality of provider records, each corresponding to a provider, the plurality of records stored in a user database;

(L) providing a button having the link to the content; and (M) providing a publisher home page, wherein the link is a hyperlink to the publisher home page; and wherein, responsive to selection of the button, a further content is stored in a further multimedia item record.

28. A system for providing a computerized collection of multimedia content provided by providers, to publishers, comprising:

(A) a received identification of digital content to be included in the system in a submittal received from a provider of multimedia content, and, responsive thereto, a stored link to the content in a multimedia item record as an intermediary between a provider and a publisher;

(B) a multimedia box, the multimedia box specifying a format in which the multimedia box may be displayed;

(C) a publisher multimedia box page created from the multimedia box, the multimedia box page having data corresponding to the multimedia item in the multimedia box;

(D) a plurality of content and a plurality of multimedia item records, each multimedia item record of the plurality storing a link corresponding to one of the content; and the plurality of multimedia item records being stored in a multimedia item database;

(E) a plurality of multimedia boxes, each multimedia box corresponding to a publisher, the plurality of multimedia boxes being stored in a multimedia box database;

(F) a plurality of publisher multimedia box pages, the publisher multimedia box pages corresponding to different publishers;

(G) a hyperlink to the publisher multimedia box page;

(H) a menubox, the menubox including at least a portion of the plurality of multimedia boxes; further comprising, responsive to a request for the menubox, a displayed list of the multimedia boxes included in the menubox;

(I) an updated link corresponding to the link to the content in the stored multimedia item;

(J) a stored publisher record, stored responsive to a request to register by the publisher, the publisher record having (i) identification information and (ii) aesthetic information;

(K) a stored provider record, stored responsive to a request to register the provider, the provider record having identification information;

(L) a plurality of publisher records, each corresponding to a publisher, the plurality of records stored in a user database;

(M) a plurality of provider records, each corresponding to a provider, the plurality of records stored in a user database;

(N) a button provided to the user, the button having the link to the content; and (O) a publisher home page, and wherein the link is a hyperlink to the publisher home page; and wherein, responsive to selection of the button, a further content is stored in a further multimedia item record.

* * * * *